No. 677,612. Patented July 2, 1901.
A. L. ALEXANDER.
SEED PLANTER.
(Application filed Mar. 23, 1901.)

(No Model.) 2 Sheets—Sheet 1.

Witnesses.
Robert Everett.
Bruce D. Everett.

Inventor:
Andrew L. Alexander.
By James L. Norris
Atty.

No. 677,612. Patented July 2, 1901.
A. L. ALEXANDER.
SEED PLANTER.
(Application filed Mar. 23, 1901.)

(No Model.) 2 Sheets—Sheet 2.

Witnesses.
Robert Everett,
Bruce D. Everett

Inventor.
Andrew L. Alexander.
By James L. Norris,
Atty.

THE NORRIS PETERS CO., PHOTO-LITHO., WASHINGTON, D. C.

UNITED STATES PATENT OFFICE.

ANDREW L. ALEXANDER, OF PIEDMONT, SOUTH CAROLINA.

SEED-PLANTER.

SPECIFICATION forming part of Letters Patent No. 677,612, dated July 2, 1901.

Application filed March 23, 1901. Serial No. 52,610. (No model.)

*To all whom it may concern:*

Be it known that I, ANDREW L. ALEXANDER, a citizen of the United States, residing at Piedmont, in the county of Anderson and State of South Carolina, have invented new and useful Improvements in Seed-Planters, of which the following is a specification.

This invention relates to certain new and useful improvements in seed-planters more particularly adapted for use for the planting of cotton-seed, although the same is applicable for use for the planting of corn, peas, or other seeds.

The invention aims to construct a seed-planter particularly adapted for planting cotton-seed in such a manner as to drop the seeds at regular intervals and at suitable distances apart, overcoming thereby the thinning-out of the cotton-plants when growing, which is a considerable source of expense and labor in the cultivation of cotton.

The invention further aims to provide a seed-planter that can be regulated so as to plant any size or kind of grain or seed, from the smallest to the largest, as well as to construct a seed-planter which shall be extremely simple in its construction, strong, durable, efficient in its operation, and comparatively inexpensive to set up; and it consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like numerals of reference indicate corresponding parts throughout the several views, and in which—

Figure 1:
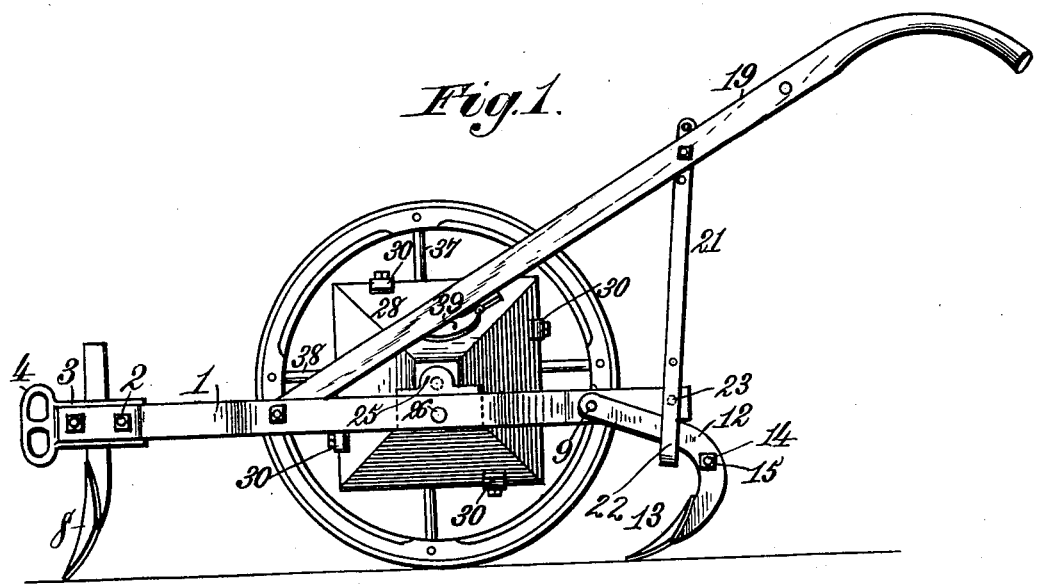
Figure 2:
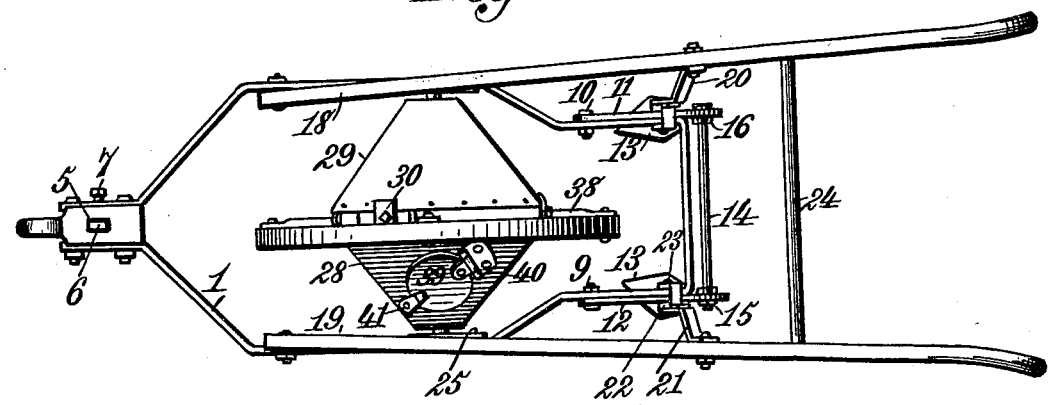
Figure 3:
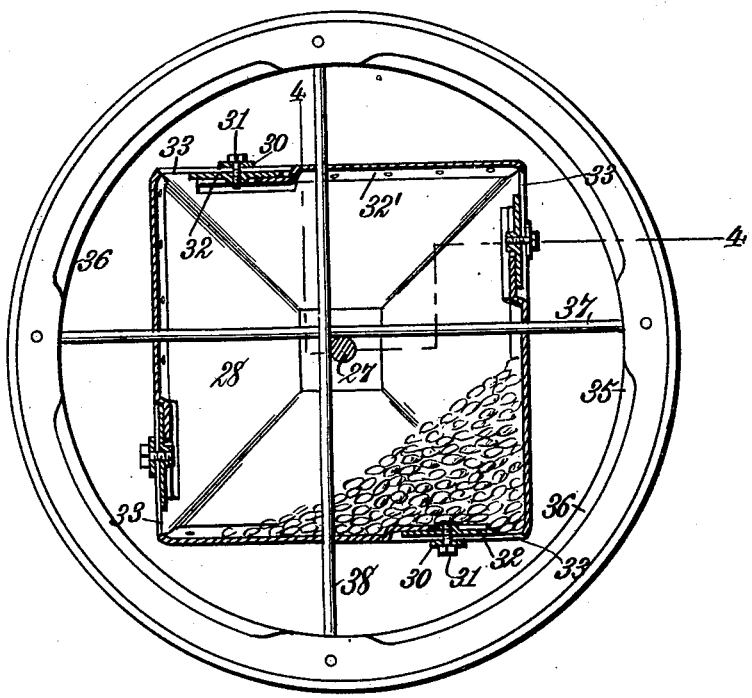
Figure 4:
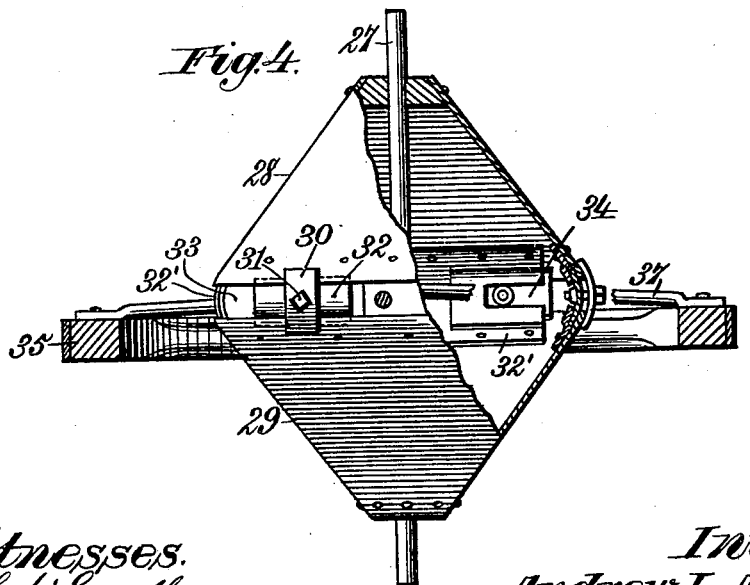

Figure 1 is a side elevation; Fig. 2, a top plan. Fig. 3 is an enlarged vertical section of the dropper; Fig. 4, a sectional plan on the lines 4 4, Fig. 3.

Referring to the drawings by reference-numerals, 1 denotes the frame of the planter, which is formed of a single bar of metal and bent to conform to the shape desired, the ends thereof converging toward each other and bolted, as at 2, to a casting 3, having the clevis 4 formed integral with the outer face thereof. By constructing the frame of a single bar, as shown, it cannot get out of repair, it will be unusually strong and durable, carry the seed closer to a stump, stone, or tree, shaping the front in the manner shown, will ward off anything at its front that might come in contact with the dropper, and then the frame is so shaped that it will prevent the catching of any object therewith. The casting 3 is provided with an opening 5, through which extends the standard 6, adjustable by means of the set-screw 7 and carrying the furrow-opener 8.

To each side of the rear of the frame 1 is pivoted, as at 9 10, the downwardly-extending curved standards 11 12, each carrying on its lower end a covering-blade 13. The arms 11 12 are connected together by means of a transversely-extending rod 14, the latter being adjustably secured to each of the arms by a pair of nuts, as at 15 16.

Pivoted at their lower ends to the forward part of the frame 1, as at 17, are the handles 18 19, adjustably connected near their upper ends to the top of the supporting-braces 20 21, these latter having the loop 22 formed at their lower ends, which is secured to the rear of the frame 1, as at 23. The loops 22 form a stop for limiting the upward-and-downward movement of the standards 11 12.

The reference-numeral 24 denotes a brace-rod for the handle 18 19 and which is suitably connected thereto.

The reference-numeral 25 denotes a pair of bearing-blocks mounted upon the upper edge of its frame 1 and secured thereto, as at 26.

Journaled in the bearing-blocks 25 is a supporting-shaft 27 for the seed-dropper, the latter comprising a pair of hollow substantially frustum-shaped sections 28 29, through the ends of which extends the shaft 27. The sections 28 29 have mounted thereon a series of clamping-ties 30. The latter are each provided with an opening through which operates a set-screw 31. The edges of the sections 28 29 do not abut and have interposed between each corresponding side a gage-strip 32, the latter being of such length as to form a discharge-outlet 33 for the seeds near each corner of the dropper and overlap the closure-strips 32', interposed between the sections of the dropper for connecting the sections together. The gage-strips are arranged between the inner face of the sections and between the closure-strips, as well as overlapping one end of the closure-strips, for the reason that when the gage-strips are adjusted no opening is formed between the same and the closure-strips. The latter are each provided with an opening 34. The gage-strips are set by means of the screw 31, so that the outlet 33 can be of any size desired. Surrounding the dropper is the drive-wheel 35, having the inner face of the rim beveled, as at 36. The wheel is provided with a pair of cross-rods or spokes 37 38, which extends through the openings 34 of the closure-strips and through the dropper. The rods or spokes 37 38 not only connect the dropper to the wheel for rotating the former simultaneously with the latter, but also form a means for agitating the seeds in the dropper. The section 28 is formed with an opening in one side for supplying seeds to the dropper and which is closed by means of the cover 39, hinged, as at 40, and retained in position by means of the catch 41.

It will be evident that when the wheel 35 is revolved the dropper will move simultaneously therewith and the seeds will be pitched from one outlet to the other and be discharged from the dropper when the lowermost corner thereof is positioned at about forty-five degrees, or, in other words, the seeds are discharged when the corresponding outlets are not in vertical alinement, but when the lowermost outlet of the dropper is at a point, say, approximately forty-five degrees. It will be observed that owing to the arrangement of the gage-strips the outlets for the seeds are formed between the upper and lower ends of the gage and closure strips, respectively, and are arranged between but two corresponding sides of the sections, or, in other words, the outlets are not formed at the exact corners, but near each alternate corner of the sections between the lower and upper ends of the strips, as mentioned, and that the outlets may be made of any desirable size, owing to the adjustability of the gage-strips, by means of the adjusting-screws. By arranging the outlets near each alternate corner of the dropper a sufficient space is formed between each dropping of the seeds, causing thereby the overcoming of the thinning of the cotton, as the plants then grow only at suitable intervals apart. It will also be observed that owing to the arrangement of the cross-rods or spokes the same will agitate the seeds when the dropper is rotating and which will materially assist the pitching of the seeds toward the outlets.

I pivot the arms carrying the covering-blades to make the same vertically adjustable, so that they will ride easily over any obstruction which may be met with during the operation of planting, and the furrow-opener is secured in the manner shown, so that the same can be vertically adjusted to the desired height.

The dropper is connected to the wheel, so that the outlets thereof will not be in alinement with the inner face of the wheel, but to one side, forming no obstruction to dropping of the seeds; but in case any of the seed should strike the inner face of the rim the latter is beveled, as shown, so the seeds will readily slide or fall therefrom.

It is thought the many advantages of my improved dropper can be readily understood from the foregoing description, taken in connection with the accompanying drawings, and it will be noted that various changes may be made in the details of construction without departing from the general spirit of my invention.

Having thus fully described my invention, what I claim as new, and desire to secure by Letters Patent, is—

1. In a seed-planter, a frame, a drive-wheel journaled therein, a dropper connected thereto and formed of a pair of frustum-shaped sections, gage-strips interposed between said sections for forming outlets at the corners thereof, a furrow-opener connected to the frame, adjustable covering-blades attached to the frame, and handles adjustably connected to the frame.

2. In a seed-planter, the combination with a supporting-frame having handles, a furrow-opener, and a pair of covering-blades attached thereto, of a dropper formed of a pair of hollow sections, gage-strips interposed between said sections and forming outlets, a drive-wheel journaled to the frame, and spokes forming agitators attached to said wheel and extending through said dropper for connecting the same to the wheel.

3. In a seed-planter, a frame, a shaft journaled thereto, a dropper mounted on said shaft and consisting of a pair of hollow sections, gage-strips interposed between said sections for forming outlets at the corners thereof, means for connecting said sections together, means for adjusting said strips, and a drive-wheel suitably connected to said dropper.

4. In a seed-planter, a dropper formed of a pair of sections, adjustable gage-strips interposed between said sections for forming outlets at the corners thereof, a drive-wheel surrounding said dropper, spokes forming agitators connected to said wheel and extending through the dropper, a frame, and means for suitably supporting said dropper and wheel from said frame.

5. In a seed-planter, the combination with a frame, of a dropper connected thereto and formed of a pair of frustum-shaped hollow sections, one of which is provided with a supply-opening, a cover therefor, means for connecting said sections together, a series of adjustable gage-strips interposed between said sections for forming outlets at the corners thereof, and supported by the connecting means for the sections, and a drive-wheel suitably connected to said dropper.

6. In a seed-planter, the combination with a frame, of a dropper connected thereto and formed of a pair of frustum-shaped hollow sections, one of which is provided with a supply-opening, a cover therefor, a series of closure-strips interposed between the sections for connecting the latter together, a series of adjustable gage-strips interposed between said sections, supported by and overlapping said closure-strips, said gage-strips forming outlets at the corners of the sections, and a drive-wheel suitably connected to said dropper.

7. In a seed-planter, the combination with a frame, of a dropper connected thereto and formed of a pair of hollow sections, one of which is provided with a supply-opening, a cover therefor, a series of strips interposed between the sections for connecting the latter together, a series of gage-strips interposed between said sections, supported by and overlapping said closure-strips, said gage-strips forming outlets, means for adjusting said gage-strips, a drive-wheel, and spokes connected to said wheel for forming agitators and extending through said dropper for connecting the same to the wheel.

In testimony whereof I have hereunto set my hand in presence of two subscribing witnesses.

ANDREW L. ALEXANDER.

Witnesses:
   J. F. MAWLDIN,
   B. F. WIGINGTON.